US012652636B2

(12) United States Patent
Sheng

(10) Patent No.: US 12,652,636 B2
(45) Date of Patent: Jun. 9, 2026

(54) NETWORK REGISTRATION METHOD AND APPARATUS, AND USER EQUIPMENT

(71) Applicant: VIVO MOBILE COMMUNICATION CO., LTD., Dongguan (CN)

(72) Inventor: Weiming Sheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 426 days.

(21) Appl. No.: 18/231,308

(22) Filed: Aug. 8, 2023

(65) Prior Publication Data

US 2023/0379857 A1      Nov. 23, 2023

Related U.S. Application Data

(63) Continuation of application No. PCT/CN2022/074259, filed on Jan. 27, 2022.

(30) Foreign Application Priority Data

Feb. 8, 2021      (CN) .......................... 202110174830.6

(51) Int. Cl.
*H04W 60/04*          (2009.01)
*H04W 60/00*          (2009.01)

(52) U.S. Cl.
CPC ......... *H04W 60/04* (2013.01); *H04W 60/001* (2025.08)

(58) Field of Classification Search
CPC ............. H04L 65/1016; H04L 65/1045; H04L 65/1046; H04L 65/1073; H04W 60/04
See application file for complete search history.

(56) References Cited

U.S. PATENT DOCUMENTS 9,420,554 B1      8/2016  Patel et al.
2006/0072468 A1*  4/2006  Trollope ............. H04L 41/0846
                                                          370/223
(Continued)

FOREIGN PATENT DOCUMENTS

CN          101588325 A      11/2009
CN          105357701 A       2/2016
(Continued)

OTHER PUBLICATIONS

International Search Report issued in corresponding International Application No. PCT/CN2022/074259, mailed Mar. 25, 2022, 4 pages.
(Continued)

*Primary Examiner* — Zhensheng Zhang
(74) *Attorney, Agent, or Firm* — IPX PLLC

(57)                  ABSTRACT

A network registration method, a user equipment, and a non-transitory computer-readable storage medium are provided. The network registration method includes: when a registration message is failed to be sent through a first connection corresponding to a first network device, sending a first request message to a second network device. The first request message is used to request the second network device to send a network address of a target network device. The method further includes receiving a first response message. The first response message is a response message that is sent by the second network device in response to the first request message. The method also includes: when the first response message includes the network address, sending the registration message to the target network device through the first connection based on the network address.

15 Claims, 4 Drawing Sheets

(56) References Cited

U.S. PATENT DOCUMENTS

| | | | |
|---|---|---|---|
| 2012/0084449 A1 | 4/2012 | Delos Reyes et al. | |
| 2013/0303164 A1* | 11/2013 | Seo ...................... | H04W 60/00 |
| | | | 455/435.1 |
| 2018/0213449 A1 | 7/2018 | Kim et al. | |
| 2019/0068587 A1 | 2/2019 | Zhao | |
| 2019/0075537 A1* | 3/2019 | Wu ...................... | H04W 76/15 |

FOREIGN PATENT DOCUMENTS

| | | | | |
|---|---|---|---|---|
| CN | 105813119 A | | 7/2016 | |
| CN | 108235428 A | | 6/2018 | |
| CN | 105794307 B | * 11/2019 | ............. | B23P 19/12 |
| CN | 110958684 A | | 4/2020 | |
| CN | 111147493 A | | 5/2020 | |
| CN | 111630898 A | | 9/2020 | |
| CN | 113038518 A | | 6/2021 | |

OTHER PUBLICATIONS

First Office Action issued in corresponding CN Patent Application No. 202110174830.6, dated Jun. 29, 2022, 7 pages.
Extended European Search Report issued in related European Application No. 22749021.6, mailed Jul. 15, 2024, 11 pages.
"3rd Generation Partnership Project; Technical Specification Group Core Network and Terminals; IMS Restoration Procedures (Release 16)", 3GPP Draft, 23380-G20, XP051937236, Dec. 20, 2019, 56 pages.

* cited by examiner

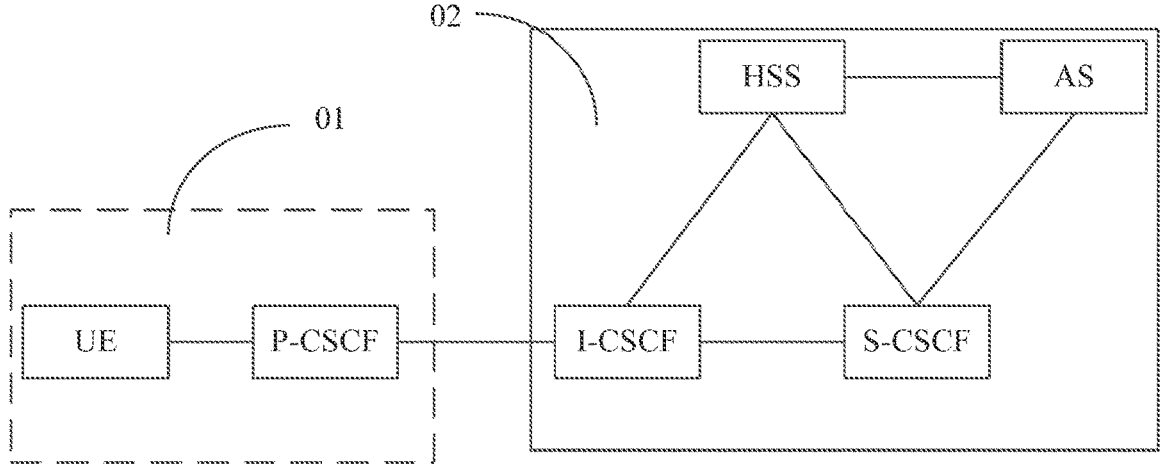

FIG. 1 (PRIOR ART)

In a case that a network registration apparatus fails to send registration message through a first connection corresponding to a first network device, the network registration apparatus sends a first request message to a second network device — 101

The network registration apparatus receives a first response message — 102

In a case that the first response message includes a network address, the network registration apparatus sends the registration message to a target network device through the first connection based on the network address — 103

FIG. 2

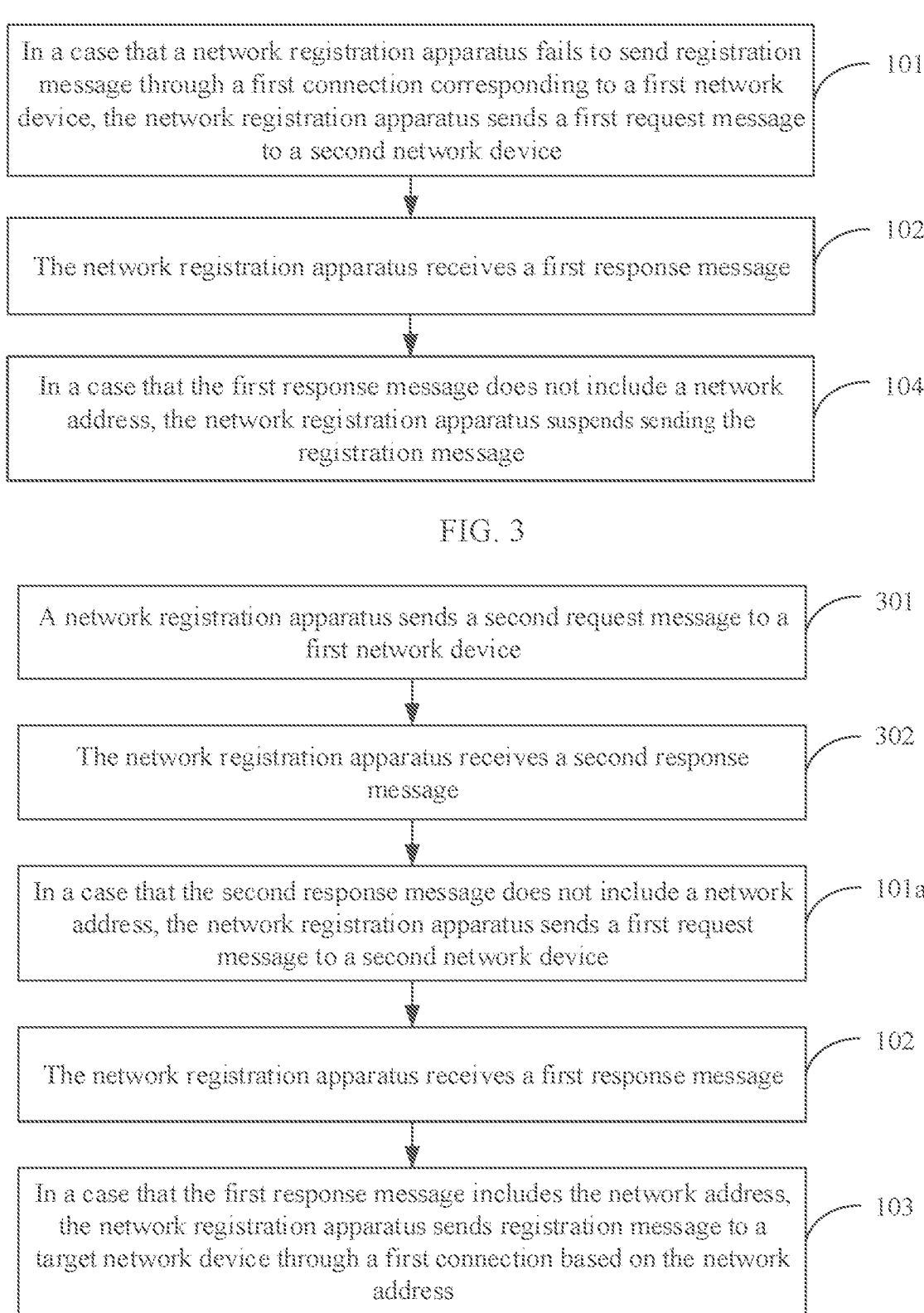

In a case that a network registration apparatus fails to send registration message through a first connection corresponding to a first network device, the network registration apparatus sends a first request message to a second network device — 101

The network registration apparatus receives a first response message — 102

In a case that the first response message does not include a network address, the network registration apparatus suspends sending the registration message — 104

FIG. 3

A network registration apparatus sends a second request message to a first network device — 301

The network registration apparatus receives a second response message — 302

In a case that the second response message does not include a network address, the network registration apparatus sends a first request message to a second network device — 101a The network registration apparatus receives a first response message — 102

In a case that the first response message includes the network address, the network registration apparatus sends registration message to a target network device through a first connection based on the network address — 103

FIG. 4

NETWORK REGISTRATION METHOD AND APPARATUS, AND USER EQUIPMENT

CROSS-REFERENCE TO RELATED APPLICATIONS

This application is a continuation of International Application No. PCT/CN2022/074259, filed on Jan. 27, 2022, which claims priority to Chinese Patent Application No. 202110174830.6, filed on Feb. 8, 2021. The entire contents of each of the above-referenced applications are expressly incorporated herein by reference.

TECHNICAL FIELD

This application relates to the field of communication technologies, and in particular to relate to a network registration method and apparatus, and user equipment.

BACKGROUND

At present, when a User Equipment (UE) needs to use a voice service based on an Internet protocol Multimedia Subsystem (IMS) network (for example, Voice over Long Term Evolution (VoLTE) or Voice over Wireless Fidelity (VoWiFi)), the user equipment needs to register with the IMS network first, and uses the voice service based on the IMS network in a case that the registration with the IMS network is successful.

The following uses an example in which the UE uses the VoLTE. The UE may first establish a Packet Data Network (PDN) connection with a 4G core network (e.g., Evolved Packet Core (EPC)) and receive a network address that is of a Proxy-Call Session Control Function (P-CSCF) of the IMS network and that is sent by the EPC. Then the UE may send a Session Initiation Protocol (SIP) registration request message to the P-CSCF through the PDN connectivity based on the network address, so as to register with the IMS network.

However, because the EPC may be abnormal, the UE may fail to send the SIP registration request message to the P-CSCF. This directly results that the UE fails to register with the IMS network. Therefore, a success rate of the network registration of the UE is low.

SUMMARY

Embodiments of this application is intended to provide a network registration method and apparatus, and user equipment.

This application is implemented as follows.

According to a first aspect, an embodiment of this application provides a network registration method. The method is applied to UE and includes: in a case that a registration message fails to be sent through a first connection corresponding to a first network device, sending a first request message to a second network device, where the first request message is used to request the second network device to send a network address of a target network device; receiving a first response message, where the first response message is a response message that is sent by the second network device in response to the first request message; and in a case that the first response message includes the network address, sending the registration message to the target network device through the first connection based on the network address.

According to a second aspect, an embodiment of this application provides a network registration apparatus. The network registration apparatus includes a sending module and a receiving module. The sending module is configured to: in a case that a registration message fails to be sent through a first connection corresponding to a first network device, send a first request message to a second network device, where the first request message is used to request the second network device to send a network address of a target network device; the receiving module is configured to receive a first response message, where the first response message is a response message that is sent by the second network device in response to the first request message that is sent by the sending module; and the sending module is further configured to: in a case that the first response message received by the receiving module includes the network address, send the registration message to the target network device through the first connection based on the network address.

According to a third aspect, an embodiment of this application provides UE, where the UE stores a program or instructions, and when the program or the instructions are executed by a processor, the steps of the method in the first aspect are implemented.

According to a fourth aspect, an embodiment of this application provides a readable storage medium, where the readable storage medium stores a program or instructions, and when the program or the instructions are executed by a processor, the steps of the method in the first aspect are implemented.

According to a fifth aspect, an embodiment of this application provides a chip. The chip includes a processor and a communication interface, the communication interface is coupled to the processor, and the processor is configured to run a program or instructions to implement the method in the first aspect.

In this embodiment of this application, in a case that the UE fails to send the registration message through the first connection corresponding to the first network device, the UE may send, to the second network device, the first request message configured to request the second network device to send the network address of the target network device, so that the UE can receive the first response message that is sent by the second network device in response to the first request message, and in the case that the first response message includes the network address of the target network device, the UE can send the registration message to the target network device through the first connection based on the network address. In a case that the UE fails to send the registration message through the first connection due to abnormality of the first network device, the UE may send, to a second network device without abnormality, a request message configured to request the network address of the target network device, so that the UE can receive the response message that is sent by the second network device without the abnormality in response to the request message, and send the registration message to the target network device through the first connection based on the network address, to register with the IMS network. This does not directly result that the UE fails to register with the IMS network, so that the success rate of the network registration of the UE can be improved.

BRIEF DESCRIPTION OF DRAWINGS

FIG. 1 is a schematic diagram of a network architecture of an IMS network;

FIG. 2 is a first schematic diagram of a network registration method according to an embodiment of this application;

FIG. 3 is a second schematic diagram of a network registration method according to an embodiment of this application;

FIG. 4 is a third schematic diagram of a network registration method according to an embodiment of this application;

DETAILED DESCRIPTION

Figure 5:
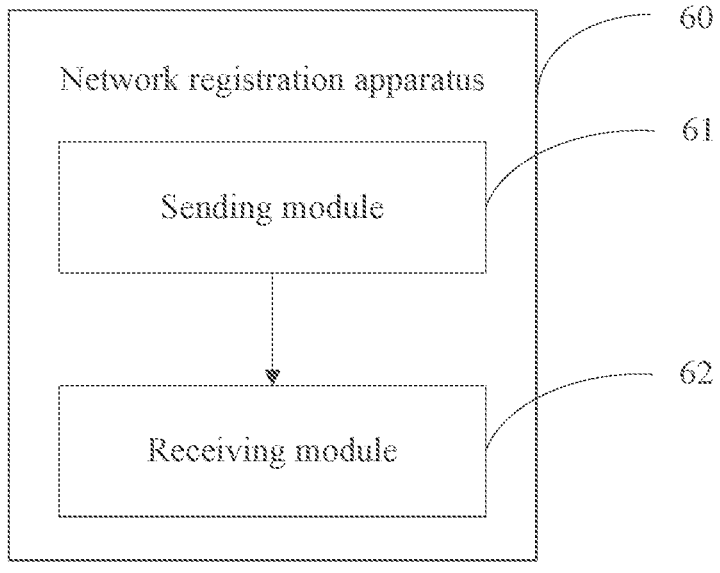
FIG. 5 is a schematic diagram of a structure of a network registration apparatus according to an embodiment of this application.

The following clearly describes technical solutions in embodiments of this application with reference to accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first", "second", and the like in the description and the claims of this application are used to distinguish between similar objects instead of describing a specific order or sequence. It should be understood that, terms used in such a way is interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specifications and the claims, "and/or" represents at least one of connected objects, and a character "/" generally represents an "or" relationship between associated objects.

In related technologies, an IMS network is a next generation network standard that is defined in the 3rd Generation Partnership Project (3GPP) and built on the basis of a SIP. The IMS network may have one or more of the following capabilities: separation of a control function and a bearer function of a multimedia service, separation of a call and a session, separation of an application and a service, separation of a service and a network, and convergence of a mobile network service and an Internet service.

FIG. 1 shows a schematic diagram of a network architecture of an IMS network. AS shown in FIG. 1, the IMS network may be divided into a visit network 01 (or visited domain) and a home network 02 (or home domain), and mainly includes one or more of the following network elements: an electronic device (for example, UE), a Session Border Controller (SBC), a P-CSCF network element, an Interrogating Call Session Control Function (I-CSCF) network element, a Serving Call Session Control Function (S-CSCF) network element, a Home Subscriber Server (HSS), and an Application Server (AS). For ease of understanding, the following briefly describes functions of the foregoing network elements.

The P-CSCF network element is an access point for the UE to connect to the IMS network, and mainly provides functions such as forwarding a SIP registration request of the UE and compressing and decompressing a SIP signaling. The P-CSCF network element may be an independent network element, or may be integrated on the SBC.

The SBC may provide functions of Network Address Translation (NAT) traversal, access control, and Quality of Service (QoS) control, and the like between an access network and an IMS core network.

The I-CSCF network element is mainly used to enable functions of routing and distributing the S-CSCF network element. After receiving the SIP registration request sent by the UE, the I-CSCF network element may route the SIP registration request to different S-CSCF network elements.

The S-CSCF network element is in a core control position in the IMS network, and is mainly responsible for authentication and session control of the UE, and enable a call routing function between the UE and another UE.

The AS provides a service in the IMS for the UE, for example, a teleconferencing service.

The HSS is a network element that is in the home network 02 and used to store subscription information of the UE. The subscription information of the UE mainly includes an identifier of the UE, security context of the UE, routing information of the UE, the subscription information of a service of the UE, and the like.

The IMS network may provide a voice service based on an LTE network. The voice service is also referred to as VoLTE. The VoLTE may carry the voice service over the LTE network without falling back to a 2G/3G network. In addition, the IMS network may also provide the voice service based on a Wi-Fi network. The voice service is also referred to as VoWiFi. The VoWiFi may carry the voice service over the Wi-Fi network without falling back to the 2G/3G network.

The following describes in detail a network registration method and apparatus, and user equipment provided in the embodiments of this application through embodiments and application scenarios thereof with reference to the accompanying drawings.

The embodiments of this application may be applied to a scenario in which the UE uses IMS-based VoLTE, and may also be applied to a scenario in which the UE uses IMS-based VoWiFi.

It is assumed that the UE needs to execute the voice service through the VoLTE. In the related technologies, after the UE is turned on, the UE may send a PDN connectivity request to a Packet Data Network Gateway (PGW) of the EPC. The PDN connectivity request is used to request the PGW to establish a PDN connectivity between the UE and the PGW. In this way, the PGW may establish a PDN connectivity between the UE and the PGW based on the PDN connectivity request, and send a PDN connectivity establishment response (e.g., activedefault EPS bearer context request) message to the UE. The activedefault EPS bearer context request includes an Internet Protocol address (IP address) of the P-CSCF network element of the IMS network. Therefore, the UE may send an SIP registration request message to the P-CSCF network element via the PGW through the PDN connectivity based on the IP address of the P-CSCF network element, to register with the VoLTE. However, the activedefault EPS bearer context request sent by the PGW may not include the IP address of the P-CSCF network element because the EPC may be abnormal. As a result, the UE cannot obtain the IP address of the P-CSCF network element, and the UE fails to send the SIP registration request message to the P-CSCF. This results that the UE fails to register with the VoLTE.

However, in this embodiment of this application, in the case that the activedefault EPS bearer context request sent by the PGW may not include the IP address of the P-CSCF network element because the EPC is abnormal, the UE may send an Internet Protocol Security (IPSec) connection request message to an evolved Packet Data Gateway (ePDG). The IPSec connection request message is used to request the ePDG to establish an IPSec communication tunnel between the UE and the ePDG. In this way, the ePDG may establish the IPSec communication tunnel between the UE and the ePDG based on the IPSec connection request message, and send an IPSec connection response message to the UE. The IPSec connection response message includes the IP address of the P-CSCF network element of the IMS network. Therefore, the UE may send the SIP registration request message to the P-CSCF network element via the PGW through the PDN connectivity based on the IP address of the P-CSCF network element, to register with the VoLTE. This improves a success rate of network registration of the UE.

In a scenario in which the UE uses the IMS-based VoWiFi, in related technologies, after the UE is turned on, the UE may send the IPSec connection request message to the ePDG. In this way, the ePDG may establish the IPSec communication tunnel between the UE and the ePDG based on the IPSec connection request message, and send an IPSec connection response message to the UE. The IPSec connection response message includes the IP address of the P-CSCF network element of the IMS network. Therefore, the UE may send the SIP registration request message to the P-CSCF network element via the ePDG through the IPSec communication tunnel based on the IP address of the P-CSCF network element, to register with the VoWiFi. However, the IPSec connection request message sent by the ePDG may not include the IP address of the P-CSCF network element because the EPC may be abnormal. As a result, the UE cannot obtain the IP address of the P-CSCF network element, and the UE fails to send the SIP registration request message to the P-CSCF. This results that the UE fails to register with the VoWiFi.

However, in this embodiment of this application, in the case that the IPSec connection request message sent by the ePDG does not include the IP address of the P-CSCF network element because the EPC may be abnormal, the UE may send the PDN connectivity request to the PGW. In this way, the PGW may establish a PDN connectivity between the UE and the PGW based on the PDN connectivity request, and send the activedefault EPS bearer context request to the UE. The activedefault EPS bearer context includes the IP of the P-CSCF network element of the IMS network. Therefore, the UE may send the SIP registration request message to the P-CSCF network element via the ePDG through the IPSec communication tunnel based on the IP address of the P-CSCF network element, to register with the VoWiFi. This improves the success rate of the network registration of the UE.

FIG. 2 is a flowchart of a network registration method according to an embodiment of this application. As shown in FIG. 2, the network registration method provided in this embodiment of this application may include the following step 101 to step 103.

Step 101: In a case that a network registration apparatus fails to send a registration message through a first connection corresponding to a first network device, the network registration apparatus sends a first request message to a second network device.

For example, in this embodiment of this application, in a case that the network registration apparatus is connected to an LTE network (or a Wi-Fi network) corresponding to the first network device, if the network registration apparatus does not obtain a network address of a target network device, the network registration apparatus fails to send the registration message through the first connection. Therefore, the network registration apparatus may send the first request message to the second network device.

For example, in this embodiment of this application, the first network device may include any one of the following: PGW or ePDG. The first connection may include any of the following: a PDN connectivity or an IPSec communication tunnel.

It may be understood that, in a case that the first network device is the PGW, the first connection may be the PDN connectivity. In a case that the first network device is the ePDG, the first connection may be the IPSec communication tunnel.

For example, in this embodiment of this application, the registration message may be a registration request message of an IMS network. The registration request message of the IMS network is used to request to register with the IMS network through the target network device.

For example, in this embodiment of this application, in the case that the network registration device fails to send the registration message through the first connection, the network registration apparatus may first send a first release request message to the first network device. The first release request message is used to request the first network device to release the first connection. In this way, in a case that the network registration apparatus receives a first release response that is sent by the first network device in response to the first release request message, the network registration apparatus may send the first request message to the second network device.

In this embodiment of this application, the first request message is used to request the second network device to send the network address of the target network device.

It may be understood that, if the network registration apparatus fails to send the registration message through the first connection, it may be because the network registration apparatus does not obtain the network address of the target network device, that is, it may be because the first network device is abnormal. Therefore, the network registration apparatus may send the first request message to the second network device without abnormality.

For example, in this embodiment of this application, the first request message may include any one of the following: an IPSec connection request message or a PDN connectivity request message. The first request message is used to request the second network device to establish the IPSec communication tunnel (or the PDN connectivity) between the network registration apparatus and the second network device.

For example, in this embodiment of this application, the second network device may include any one of the following: ePDG or PGW.

It may be understood that the second network device is different from the first network device.

For example, in this embodiment of this application, the target network device may be a P-CSCF network element of the IMS network.

Step 102: The network registration apparatus receives a first response message.

In this embodiment of this application, the first response message is a response message that is sent by the second network device in response to the first request message.

For example, in this embodiment of this application, after the network registration apparatus sends the first request message, the second network device may establish an IPSec connection between the network registration apparatus and the second network device, obtain the network address of the target network device, and send the first response message to the network registration apparatus.

Further, for example, in this embodiment of this application, the first response message may include the network address of the target network device, or may not include the network address of the target network device.

It may be understood that, in a case that the second network device is not abnormal, the first response message may include the network address of the target network device, and in a case that the second network device is abnormal, the first response message does not include the network address of the target network device.

Step 103: In a case that the first response message includes the network address, the network registration apparatus sends the registration message to the target network device through the first connection based on the network address.

It may be understood that, if the first response message includes the network address of the target network device, it may be considered that the second network device is not abnormal. Therefore, the network registration apparatus may send the registration message to the target network device through the first connection based on the network address.

For example, in this embodiment of this application, after the network registration apparatus sends the registration message to the target network device through the first connection, the target network device may forward the registration message to another network device, to perform registration with the IMS network.

Further, for example, in this embodiment of this application, after the network registration apparatus sends the registration message to the target network device through the first connection, the target network device may forward the registration message to an I-CSCF network element. The I-CSCF network element may allocate an S-CSCF network element for the network registration apparatus, and forward the registration message to the allocated S-CSCF network element, so that the allocated C-CSCF network element may verify the registration message based on the registration message and authentication data of the network registration apparatus obtained from an HSS. After the verification is passed, the allocated S-CSCF network element may send a message of successful registration to the network registration apparatus through the S-CSCF network element, the I-CSCF network element, the P-CSCF network element, and the PGW, to complete the registration on the IMS network of the network registration apparatus.

According to the network registration method provided in this embodiment of this application, in the case that the network registration apparatus fails to send the registration message through the first connection corresponding to the first network device, the network registration apparatus can send, to the second network device, the first request message configured to request the second network device to send the network address of the target network device, so that the network registration apparatus can receive the first response message that is sent by the second network device in response to the first request message, and in the case that the first response message includes the network address of the target network device, the network registration apparatus can send the registration message to the target network device through the first connection based on the network address. In a case that the network registration apparatus fails to send the registration message through the first connection due to abnormality of the first network device, the network registration apparatus can send, to a second network device without abnormality, a request message configured to request the network address of the target network device, so that the network registration apparatus can receive the response message that is sent by the second network device without the abnormality in response to the request message, and send the registration message to the target network device through the first connection based on the network address, to register with the IMS network. This does not directly result that the network registration apparatus fails to register with the IMS network, so that the success rate of the network registration of the network registration apparatus can be improved.

In a case that the first network device is abnormal, the second network device may also be abnormal. The following illustrates by taking an example in which both the first network device and the second network device are abnormal.

For example, in this embodiment of this application, with reference to FIG. 2, as shown in FIG. 3, step 103 may be replaced with the following step 104.

Step 104: In a case that the first response message does not include the network address, the network registration apparatus interrupts to send the registration message.

It can be understood that, if the first response message does not include the network address of the target network device, it can be considered that the second network device is abnormal. Therefore, the network registration apparatus may suspend sending the registration message, that is, the registration on the IMS network fails.

Further, for example, in this embodiment of this application, the network registration apparatus may determine whether a preset condition is met. Therefore, in a case that the preset condition is met, the network registration apparatus may send the registration message again.

For example, the preset condition may include one of the following:

an interval between time when the network registration apparatus suspends sending the registration message and current system time of the network registration apparatus is greater than or equal to a preset time interval; or the network registration apparatus receives an input that the user triggers the network registration apparatus and sends the registration message.

Further, for example, in this embodiment of this application, the network registration apparatus may first send a fourth request message to the first network device, and the fourth request message is used to request the first network device to establish a first connection between the network registration apparatus and the first network device, so that the network registration apparatus may receive a third response message that is sent by the first network device in response to the fourth request message, and in a case that the third response message includes the network address of the target network device, send the registration message to the target network device through the first connection based on the network address, to send the registration message again.

Therefore, in a case that the second network device is also abnormal, the network registration apparatus suspends sending the registration message instead of sending the registration message for many times, so that power consumption of the network registration apparatus is saved and resources is saved.

For example, in this embodiment of this application, after step 104, the network registration method provided in this embodiment of this application may further include the following step 201.

Step 201: If the preset condition is met, the network registration apparatus sends the third request message to the first network device.

It can be understood that, if the preset condition is met, it can be considered that the abnormality of the first network device may be resolved, and therefore, the network registration apparatus may send the third request message to the first network device.

In this embodiment of this application, the third request message is used to request the first network device to send the network address of the target network device.

Further, for example, in this embodiment of this application, the third request message may include any one of the following: the PDN connectivity request message or the IPSec connection request message. The third request message is used to request the first network device to establish the PDN connectivity (or the IPSec communication tunnel) between the network registration apparatus and the first network device.

Further, for example, in this embodiment of this application, after the network registration apparatus sends the third request message, the network registration apparatus may receive a fourth response message that is sent by the first network device in response to the third request message, so that in a case that the fourth response message includes the network address of the target network device, the network registration apparatus may send the registration message to the target network device through the first connection based on the network address.

Therefore, in a case that the abnormality of the first network device is resolved, the network registration apparatus sends the third request message to the first network device, to request the first network device to send the network address of the target network device and send the registration message to the target network device again, so that the success rate of network registration of the network registration apparatus is improved, and use experience of the user is improved.

The following illustrates how the network registration apparatus sends the first request message to the second network device in the case that the network registration apparatus fails to send the registration message through the first connection.

For example, in this embodiment of this application, with reference to FIG. 2, as shown in FIG. 4, before step 101, the network registration method provided in this embodiment of this application may further include the following steps 301 and 302, and step 101 may be implemented by step 101*a*.

Step 301: The network registration apparatus sends the second request message to the first network device.

Further, for example, in this embodiment of this application, after the network registration apparatus is turned on, the network registration apparatus first sends a network connection establishment request to the first network device, to connect to the LTE network (or the Wi-Fi network) corresponding to the first network device, and when the network registration apparatus enables a VoLTE function (or a VoWiFi function), the network registration apparatus sends the second request message to the first network device.

In this embodiment of this application, the second request message is used to request the first network device to send the network address of the target network device.

Further, for example, in this embodiment of this application, the second request message may include any one of the following: the PDN connectivity request message or the IPSec connection request message. The second request message is used to request the first network device to establish the first connection, that is, the PDN connectivity (or the IPSec communication tunnel) between the network registration apparatus and the first network device.

It can be understood that after the network registration apparatus sends the second request message, the first network device may establish the first connection between the first network device and the network registration apparatus.

Step 302: The network registration apparatus receives a second response message.

In this embodiment of this application, the second response message is a response message that is sent by the first network device in response to the second request message.

Further, for example, in this embodiment of this application, the second response message may include the network address of the target network device, or may not include the network address of the target network device.

It can be understood that, in a case that the first network device is not abnormal, the second response message may include the network address of the target network device, and in the case that the first network device is abnormal, the second response message does not include the network address of the target network device.

Step 101*a*: In the case that the second response message does not include the network address, the network registration apparatus sends the first request message to the second network device.

It can be understood that, if the second response message does not include the network address of the target network device, it can be considered that the first network device is abnormal, the network registration apparatus does not send the registration message to the target network device through the first connection based on the network address, that is, the network registration apparatus fails to send the registration message through the first connection.

Therefore, in the case that the second response message does not include the network address of the target network device, the network registration apparatus determines that the first network device is abnormal. Therefore, the network registration apparatus may send, to the second network device without abnormality, the request message configured to request the network address of the target network device, and the network registration apparatus may send the registration message to the target network device through the first connection based on the network address, to register with the IMS network, so that the success rate of the network registration of the network registration apparatus is improved.

The first network device may not be abnormal, and therefore, the network registration apparatus can directly register with the IMS network.

For example, in this embodiment of this application, step 101*a* may be replaced with step 101*b*.

Step 101*b*: In a case that the second response message includes the network address, the network registration apparatus sends the registration message to the target network device through the first connection based on the network address.

It can be understood that, if the second response message includes the network address of the target network device, it can be considered that the first network device is not abnormal. Therefore, the network registration apparatus may directly send the registration message to the target network device through the first connection based on the network address.

Therefore, in the case that the first network device is not abnormal, the network registration apparatus may directly send the registration message to the target network device through the first connection based on the network address, to register with the IMS network, so that network registration efficiency of the network registration apparatus is improved.

It should be noted that the network registration method provided in this embodiment of this application may be performed by the network registration apparatus or a control module that is in the network registration apparatus and that is configured to perform the network registration method. In this embodiment of this application, an apparatus of the network registration method according to an embodiment of this application is described by using an example in which the network registration apparatus performs the network registration method.

FIG. 5 is a schematic diagram of a possible structure of a network registration apparatus according to an embodiment of this application. As shown in FIG. 5, a network registration apparatus 60 may include a sending module 61 and a receiving module 62.

The sending module 61 is configured to: in a case that a registration message fails to be sent through a first connection corresponding to a first network device, send a first request message to a second network device, where the first request message is used to request the second network device to send a network address of a target network device. The receiving module 62 is configured to: receive a first response message, where the first response message is a response message that is sent by the second network device in response to the first request message that is sent by the sending module 61. The sending module 61 is further configured to: in a case that the first response message received by the receiving module 62 includes the network address, send the registration message to the target network device through the first connection based on the network address.

In a possible implementation, the sending module 61 sends a second request message to the first network device, where the second request message is used to request the first network device to send the network address. The receiving module 62 is further configured to receive a second response message, where the second response message is a response message that is sent by the first network device in response to the second request message sent by the sending module 61. The sending module 61 is configured to: in a case that the second response message received by the receiving module 62 does not include the network address, send the first request message to the second network device.

In a possible implementation, the sending module 61 is further configured to: in a case that the second response message includes the network address, send the registration message to the target network device through the first connection based on the network address.

In a possible implementation, the sending module 61 is further configured to: in a case that the first response message does not include the network address, suspend sending the registration message.

In a possible implementation, the sending module 61 is further configured to: if a preset condition is met, send a third request message to the first network device, where the third request message is used to request the first network device to send the network address.

According to the network registration apparatus provided in this embodiment of this application, in a case that the network registration apparatus fails to send the registration message through the first connection due to abnormality of the first network device, the network registration apparatus can send, to a second network device without abnormality, a request message configured to request the network address of the target network device, so that the network registration apparatus can receive the response message that is sent by the second network device without the abnormality in response to the request message, and send the registration message to the target network device through the first connection based on the network address, to register with the IMS network. This does not directly result that the network registration apparatus fails to register with the IMS network, so that the success rate of the network registration of the network registration apparatus can be improved.

The network registration apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an Ultra-Mobile Personal Computer (UMPC), a netbook, or a Personal Digital Assistant (PDA), and the non-mobile electronic device may be a server, a Network Attached Storage (NAS), a Personal Computer (PC), a Television (TV), a counter, or a self-service machine. This is not specifically limited in this embodiment of this application.

The network registration apparatus in this embodiment of this application may be an apparatus with an operating system. The operating system may be an Android operating system, an iOS operating system, or another possible operating system. This is not specifically limited in the embodiments of this application.

The network registration apparatus provided in this embodiment of this application can implement processes implemented in the method embodiments from FIG. 2 to FIG. 4. To avoid repetition, details are not described herein again.

Figure 6:
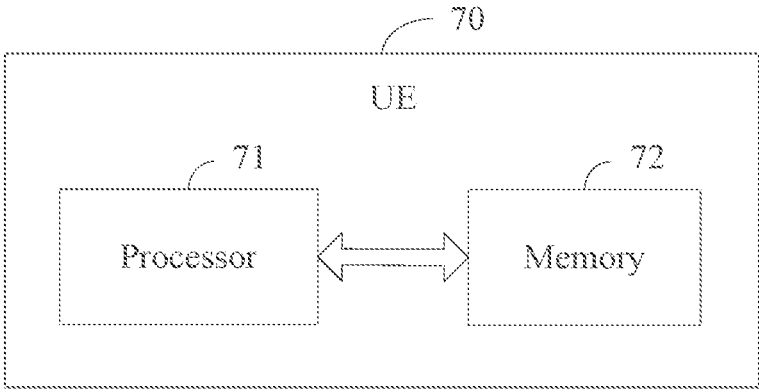
FIG. 6 is a schematic diagram of a structure of UE according to an embodiment of this application.

For example, as shown in FIG. 6, an embodiment of this application further provides UE 70, including a processor 72, a memory 71, and a program or an instruction that is stored in the memory 71 and that can be run on the processor 72. When the program or the instruction is executed by the processor 72, the processes of the foregoing network registration method embodiment are implemented and a same technical effect can be achieved. To avoid repetition, details are not described herein again.

It should be noted that the UE in this embodiment of this application includes the foregoing mobile electronic device and the foregoing non-mobile electronic device.

Figure 7:
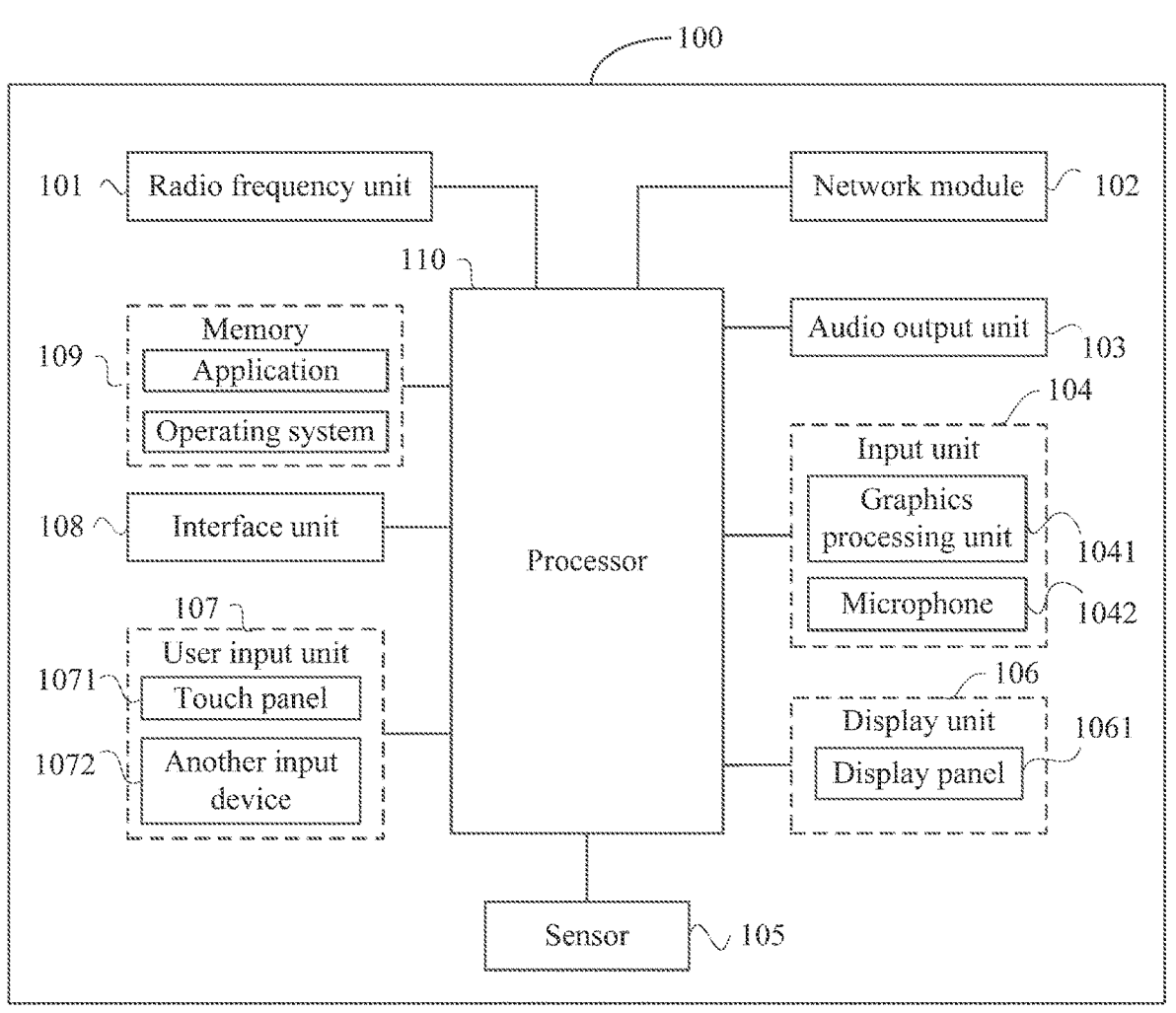
FIG. 7 is a schematic diagram of hardware of UE according to an embodiment of this application.

FIG. 7 is a schematic structural diagram of hardware of UE according to an embodiment of this application.

UE 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the UE 100 may further include a power supply (such as a battery) that supplies power to each component. The power supply may be logically connected to the processor 110 by using a power supply management system, to implement functions such as charging and discharging management, and power consumption management by using the power supply management system. The structure of the UE shown in FIG. 7 constitutes no limitation on the UE, and the UE may include more or fewer components than those shown in the figure, or combine some components, or have different component arrangements. Details are not described herein.

The radio frequency unit 101 is configured to: in a case that a registration message fails to be sent through a first connection corresponding to a first network device, sending a first request message to a second network device, where the first request message is used to request the second network device to send a network address of a target network device; receiving a first response message, where the first response message is a response message that is sent by the second network device in response to the first request message; and in a case that the first response message includes the network address, sending the registration message to the target network device through the first connection based on the network address.

According to the UE provided in this embodiment of this application, in a case that the UE fails to send the registration message through the first connection due to abnormality of the first network device, the UE can send, to a second network device without abnormality, a request message configured to request the network address of the target network device, so that the UE can receive the response message that is sent by the second network device without the abnormality in response to the request message, and send the registration message to the target network device through the first connection based on the network address, to register with the IMS network. This does not directly result that the UE fails to register with the IMS network, so that the success rate of the network registration of the UE can be improved.

For example, in this embodiment of this application, the radio frequency unit 101 is further configured to: send a second request message to the first network device, where the second request message is used to request the first network device to send the network address; and receive a second response message, where the second response message is a response message that is sent by the first network device in response to the second request message.

The radio frequency unit 101 is configured to: in a case that the second response message does not include the network address, send the first request message to the second network device.

Therefore, in the case that the second response message does not include the network address of the target network device, the UE may determine that the first network device is abnormal. Therefore, the UE may send, to the second network device without abnormality, the request message configured to request the network address of the target network device, and the UE may send the registration message to the target network device through the first connection based on the network address, to register with the IMS network, so that the success rate of the network registration of the UE is improved.

For example, in this embodiment of this application, the radio frequency unit 101 is further configured to: in a case that the second response message includes the network address, send the registration message to the target network device through the first connection based on the network address.

Therefore, in the case that the first network device is not abnormal, the UE may directly send the registration message to the target network device through the first connection based on the network address, to register with the IMS network, so that network registration efficiency of the UE is improved.

For example, in this embodiment of this application, the radio frequency unit 101 is further configured to: in a case that the first response message does not include the network address, suspend sending the registration message.

Therefore, in the case that the second network device is also abnormal, the UE suspends sending the registration message instead of sending the registration message for many times, so that power consumption of the UE is saved and resources is saved.

For example, in this embodiment of this application, the radio frequency unit 101 is further configured to: if a preset condition is met, send a third request message to the first network device, where the third request message is used to request the first network device to send the network address.

Therefore, in a case that the abnormality of the first network device is resolved, the UE sends the third request message to the first network device, to request the first network device to send the network address of the target network device and send the registration message to the target network device again, so that the success rate of network registration of the UE is improved, and use experience of the user is improved.

It should be understood that, in this embodiment of this application, the input unit 104 may include a Graphics Processing Unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 that is also referred to as a touchscreen panel, may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application program and an operating system. The processor 110 may be integrated with an application processor and a modem processor. The application processor mainly processes an operating system, a user interface, an application program, and the like. The modem processor mainly processes wireless communication. It can be understood that, in some alternative embodiments, the modem processor may not be integrated into the processor 110.

An embodiment of this application further provides a readable storage medium. The readable storage medium stores a program or an instruction, and when the program or the instruction is executed by a processor, the processes of the foregoing network registration method embodiment are implemented and a same technical effect can be achieved. To avoid repetition, details are not described herein again.

The processor is a processor in the UE in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing network registration method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "include", or any other variant thereof are intended to cover a non-exclusive inclusion, so that a process, a method, an article, or an apparatus that includes a list of elements not only includes those elements but also includes other elements which are not expressly listed, or further includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. In some embodiments, the technical solutions of this application entirely or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A network registration method, performed by a User Equipment (UE), comprising:
   when a registration message is failed to be sent to a first network device through a first connection, sending a first request message to a second network device, wherein the first request message is used to request the second network device to send a network address of a target network device;
   receiving a first response message, wherein the first response message is a response message that is sent by the second network device in response to the first request message; and when the first response message comprises the network address of the target network device, sending the registration message to the target network device corresponding to the network address through the first connection.

2. The network registration method according to claim 1, wherein:
   before the sending a first request message to a second network device when a registration message is failed to be sent to a first network device through a first connection, the method further comprises:
      sending a second request message to the first network device, wherein the second request message is used to request the first network device to send the network address, and
      receiving a second response message, wherein the second response message is a response message that is sent by the first network device in response to the second request message; and
   the sending a first request message to a second network device when a registration message is failed to be sent to a first network device through a first connection comprises:
   when the second response message does not comprise the network address of the target network device, sending the first request message to the second network device.

3. The network registration method according to claim 2, further comprising:
   when the second response message comprises the network address of the target network device, sending the registration message to the target network device corresponding to the network address through the first connection.

4. The network registration method according to claim 1, further comprising:
   when the first response message does not comprise the network address, suspending sending the registration message.

5. The network registration method according to claim 4, wherein after the suspending sending the registration message, the method further comprises:
   when a preset condition is met, sending a third request message to the first network device, wherein the third request message is used to request the first network device to send the network address.

6. A User Equipment (UE), comprising a processor; and a memory having a computer program or an instruction stored thereon, wherein the computer program or the instruction, when executed by the processor, causes the processor to perform a network registration method, comprising:
   when a registration message is failed to be sent to a first network device through a first connection, sending a first request message to a second network device, wherein the first request message is used to request the second network device to send a network address of a target network device;
   receiving a first response message, wherein the first response message is a response message that is sent by the second network device in response to the first request message; and
   when the first response message comprises the network address of the target network device, sending the registration message to the target network device corresponding to the network address through the first connection.

7. The UE according to claim 6, wherein:

before the sending a first request message to a second network device when a registration message is failed to be sent to a first network device through a first connection, the method further comprises:

sending a second request message to the first network device, wherein the second request message is used to request the first network device to send the network address, and receiving a second response message, wherein the second response message is a response message that is sent by the first network device in response to the second request message; and the sending a first request message to a second network device when a registration message is failed to be sent to a first network device through a first connection comprises:

when the second response message does not comprise the network address of the target network device, sending the first request message to the second network device.

8. The UE according to claim 7, wherein the method further comprises:

when the second response message comprises the network address of the target network device, sending the registration message to the target network device corresponding to the network address through the first connection.

9. The UE according to claim 6, wherein the method further comprises:

when the first response message does not comprise the network address, suspending sending the registration message.

10. The UE according to claim 9, wherein after the suspending sending the registration message, the method further comprises:

when a preset condition is met, sending a third request message to the first network device, wherein the third request message is used to request the first network device to send the network address.

11. A non-transitory computer-readable storage medium storing a computer program or an instruction that, when executed by a processor, causes the processor to perform a network registration method, comprising:

when a registration message is failed to be sent to a first network device through a first connection, sending a first request message to a second network device, wherein the first request message is used to request the second network device to send a network address of a target network device;

receiving a first response message, wherein the first response message is a response message that is sent by the second network device in response to the first request message; and when the first response message comprises the network address of the target network device, sending the registration message to the target network device corresponding to the network address through the first connection.

12. The non-transitory computer-readable storage medium according to claim 11, wherein:

before the sending a first request message to a second network device when a registration message is failed to be sent to a first network device through a first connection, the method further comprises:

sending a second request message to the first network device, wherein the second request message is used to request the first network device to send the network address, and receiving a second response message, wherein the second response message is a response message that is sent by the first network device in response to the second request message; and the sending a first request message to a second network device when a registration message is failed to be sent to a first network device through a first connection comprises:

when the second response message does not comprise the network address of the target network device, sending the first request message to the second network device.

13. The non-transitory computer-readable storage medium according to claim 12, wherein the method further comprises:

when the second response message comprises the network address of the target network device, sending the registration message to the target network device corresponding to the network address through the first connection.

14. The non-transitory computer-readable storage medium according to claim 11, wherein the method further comprises:

when the first response message does not comprise the network address, suspending sending the registration message.

15. The non-transitory computer-readable storage medium according to claim 14, wherein after the suspending sending the registration message, the method further comprises:

when a preset condition is met, sending a third request message to the first network device, wherein the third request message is used to request the first network device to send the network address.

* * * * *